US012379682B2

(12) United States Patent
Kurata et al.

(10) Patent No.: US 12,379,682 B2
(45) Date of Patent: Aug. 5, 2025

(54) GREASE COMPOSITION FOR HEAT FIXING DEVICES AND HEAT FIXING APPARATUS

(71) Applicant: CANON KABUSHIKI KAISHA, Tokyo (JP)

(72) Inventors: Munehito Kurata, Shizuoka (JP); Hisashi Nakahara, Shizuoka (JP); Hirohiko Aiba, Shizuoka (JP); Daisuke Sato, Ibaraki (JP); Hideo Nanataki, Kanagawa (JP); Masahito Omata, Kanagawa (JP); Hiroyuki Sakakibara, Kanagawa (JP); Takaaki Akamatsu, Kanagawa (JP); Yoshihito Oshima, Kanagawa (JP); Koichi Sugawara, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/659,979

(22) Filed: May 9, 2024

(65) Prior Publication Data

US 2024/0384196 A1 Nov. 21, 2024

(30) Foreign Application Priority Data

May 15, 2023 (JP) ................................ 2023-080059

(51) Int. Cl.
*G03G 15/20* (2006.01)
*C10M 101/00* (2006.01)
(Continued)

(52) U.S. Cl.
CPC ..... *G03G 15/2025* (2013.01); *G03G 15/2017* (2013.01); *G03G 15/2064* (2013.01);
(Continued)

(58) Field of Classification Search
CPC ........... G03G 15/2017; G03G 15/2064; C10M 111/04; C10M 101/00; C10M 107/38;
(Continued)

(56) References Cited

U.S. PATENT DOCUMENTS

| | | | | |
|---|---|---|---|---|
| 2015/0316881 A1* | 11/2015 | Aiba | .................... | C10M 169/04 399/329 |
| 2019/0204766 A1* | 7/2019 | Lee | .................... | G03G 15/2025 |
| 2021/0054300 A1* | 2/2021 | Oshima | .............. | G03G 15/2025 |

FOREIGN PATENT DOCUMENTS

| | | |
|---|---|---|
| JP | H0527619 A | 4/1993 |
| JP | 2012237945 A | 12/2012 |
| JP | 2016024348 A | 2/2016 |

* cited by examiner

*Primary Examiner* — Joseph S Wong
(74) *Attorney, Agent, or Firm* — Canon U.S.A., Inc. IP Division

(57) ABSTRACT

A grease composition for heat fixing devices contains a base oil and polytetrafluoroethylene. The base oil contains a perfluoropolyether having at least one of the structures represented by formulas (I) and (II) in the molecule and has a kinematic viscosity v40 of 800 $mm^2/s$ to 2500 $mm^2/s$ at 40° C., and whose kinematic viscosity v200 at 200° C. is 1/50 or less of the kinematic viscosity v40.

(I)

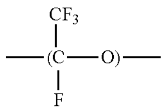

(II)

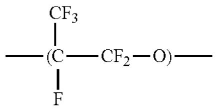

2 Claims, 3 Drawing Sheets

(51) Int. Cl.
*C10M 107/38* (2006.01)
*C10M 111/04* (2006.01)
*C10N 30/02* (2006.01)
*C10N 50/10* (2006.01)

(52) U.S. Cl.
CPC ......... *C10M 101/00* (2013.01); *C10M 107/38* (2013.01); *C10M 111/04* (2013.01); *C10M 2203/003* (2013.01); *C10M 2213/0623* (2013.01); *C10N 2030/02* (2013.01); *C10N 2050/10* (2013.01)

(58) Field of Classification Search
CPC .... C10M 2203/003; C10M 2213/0623; C10N 2030/02; C10N 2050/10
See application file for complete search history.

GREASE COMPOSITION FOR HEAT FIXING DEVICES AND HEAT FIXING APPARATUS

BACKGROUND

Field

The present disclosure relates to a grease composition for a heat fixing apparatus and a heat fixing device.

Description of the Related Art

Heat fixing devices with excellent quick-start and power-saving characteristics have recently been devised as the fixing device to be installed in image forming apparatuses.

Japanese Patent Laid-Open No. 5-27619 discloses a heat fixing device that heats a film using a ceramic heater. The heat fixing device that heats a film using a ceramic heater includes a fixing film as a flexible rotor, a heater in contact with the inner surface of the fixing film that generates heat when energized, and a pressure roller that forms a fixing nip with the heater with the fixing film in between.

Also, Japanese Patent Laid-Open No. 2012-237945 discloses a heat fixing device using a halogen heater that heats a film by radiation, and Japanese Patent Laid-Open No. 2016-24348 discloses a heat fixing device that heats a film by induction heating.

The heat fixing devices using a film-heating technique by radiation heating or induction heating differ in the heat source, but both include a fixing film to be heated and a nip forming member that comes into contact with the inner surface of the fixing film and forms a fixing nip with a pressure roller with the fixing film in between.

Any of those heat fixing devices fixes unfixed images formed on a recording medium by pinching and conveying the recording medium with the unfixed images in the fixing nip to apply heat from the fixing film or pressure in the fixing nip to the recording medium.

Such heat fixing devices are known to have a structure using a lubricant between the inner surface of the fixing film and the heater or the nip forming member (hereinafter referred to as the nip forming member, including the heater) to ensure a sliding ability in the fixing nip between the inner surface of the fixing film and the surface of the nip forming member.

While the heat fixing device is operating, the inner surface of the fixing film and the surface of the nip forming member become hot and, therefore, fluorinated grease compositions (hereinafter simply referred to as "grease composition"), which are stable even under high-temperature conditions, are used as the lubricant. Such a grease composition mainly contains a base oil and a thickener. The base oil contains perfluoropolyether oil (PFPE), and the thickener contains a polytetrafluoroethylene (PTFE) homopolymer or copolymer.

As the service life of electrophotographic image forming apparatuses such as laser beam printers (hereinafter referred to as "image forming apparatuses") has further increased, the heat fixing device has been required to have a still longer service life.

To increase the service life of heat fixing devices, it is effective to ensure a sliding ability between the inner surface of the fixing film and the nip forming member, that is, to reduce the friction between the inner surface of the fixing film and the nip forming member, in the fixing nip while the heat fixing device is operating. If the heat fixing devices continue to be used with poor sliding ability, that is, with large friction, the fixing film may be damaged, or the nip forming member (e.g., heater) may be damaged.

To reduce the friction between the inner surface of the fixing film and the nip forming member, reducing the kinematic viscosity of the base oil in the grease composition may be appropriate.

In particular, to ensure a sliding ability between the inner surface of the fixing film and the nip forming member while the heat fixing device is operating and in a high-temperature state, reducing the kinematic viscosity at high temperatures may be effective. However, when a base oil with a low kinematic viscosity is simply used, the base oil has a low viscosity at room temperature and exhibits large fluidity, consequently easily leaking from an end of the fixing film. Thus, in some cases, the amount of base oil in the lubricant between the inner surface of the fixing film and the nip forming member decreases as time passes after the heat fixing device is manufactured. If the base oil is reduced and depleted, the sliding ability between the inner surface of the fixing film and the nip forming member may also deteriorate, leading to damage to the fixing film or the nip forming member.

SUMMARY OF THE INVENTION

At least one aspect of the present disclosure is directed to a grease composition for heat fixing devices that can prevent the base oil from leaking out and ensure a sliding ability between the inner surface of the fixing film and the nip forming member. At least another aspect of the present disclosure is directed to a heat fixing device with long-life durability.

According to at least one aspect of the present disclosure, a grease composition is provided for heat fixing devices. The grease composition contains a base oil and polytetrafluoroethylene. The base oil contains a perfluoropolyether having at least the structure selected from the group consisting of a structure represented by formula (I) and a structure represented by formula (II) in the molecule. The base oil has a kinematic viscosity v40 of 800 $mm^2/s$ to 2500 $mm^2/s$ at 40° C., and whose kinematic viscosity v200 at 200° C. is 1/50 or less of the kinematic viscosity v40.

(I)

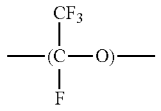

(II)

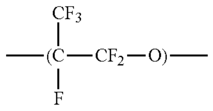

According to at least another aspect of the present disclosure, a heat fixing device is provided. The heat fixing device includes a heating rotor, a slide portion on which the heating rotor slides during rotation, a pressure rotor disposed opposite the heating rotor, and a grease composition between the slide portion and the heating rotor. The grease composition contains a base oil and polytetrafluoroethylene. The base oil contains a perfluoropolyether having at least one structure selected from the group consisting of a structure represented by the above formula (I) and a structure represented by the above formula (II) in the molecule. The base oil has a kinematic viscosity v40 of 800 $mm^2/s$ to 2500

$mm^2/s$ at 40° C., and whose kinematic viscosity v200 at 200° C. is 1/50 or less of the kinematic viscosity v40.

Further features of the present invention will become apparent from the following description of exemplary embodiments with reference to the attached drawings.

DESCRIPTION OF THE EMBODIMENTS

Figure 1:
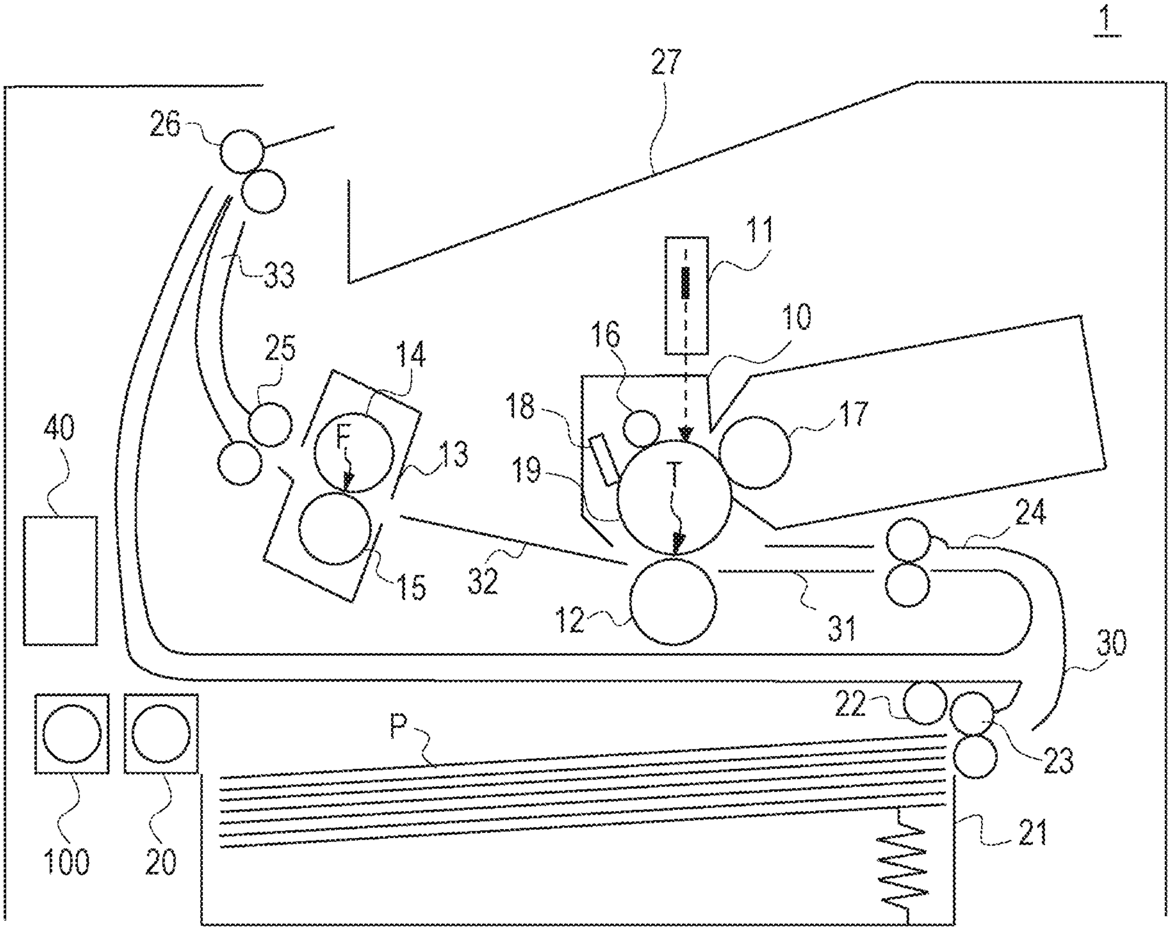
FIG. 1 is a schematic sectional view of an image forming apparatus involved in an embodiment of the present disclosure.

Exemplary embodiments of the present disclosed will now be described with reference to the drawings. However, the dimensions, materials, shapes, and relative positions of the components disclosed in the embodiments should be changed as needed according to the configuration and various conditions of the device to which the present disclosure is applied. Hence, the scope of the present disclosure is not limited to the following embodiments. In the description disclosed herein, numerical ranges expressed as "xx to yy" include the lower and upper limits that are the endpoints unless otherwise specified.

(1) Grease Composition

The grease composition disclosed herein contains the following components (A) and (B):

(A) Base oil having a kinematic viscosity v40 of 800 $mm^2/s$ to 2500 $mm^2/s$ at 40° C. and whose kinematic viscosity v200 at 200° C. is 1/50 or less of the kinematic viscosity v40; and (B) Polytetrafluoroethylene.

It is not precluded to add additives that are usually blended in addition to the above components (A) and (B) depending on the application, such as a solid lubricant, a thickener, an antioxidant, an extreme pressure agent, an oiliness agent, a rust preventive, a corrosion inhibitor, a metal deactivator, a dye, a color stabilizer, a viscosity index improver, and a structural stabilizer.

Component (A) contains a perfluoropolyether oil (PFPE) having at least one structure selected from the group consisting of a structure represented by the following formula (I) and a structure represented by the following formula (II) in the molecule. That is, the perfluoropolyether may have a structure represented by formula (I) in the molecule, the perfluoropolyether may have a structure represented by formula (II) in the molecule, or the perfluoropolyether may have both a structure represented by formula (I) and the structure represented by formula (II) in the molecule.

(I)

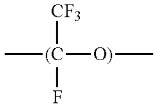

(II)

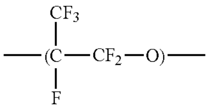

The PFPE is chemically inert and does not decompose easily, even at high temperatures. The PFPE is, therefore, suitable as the base oil of the grease composition for heat fixing devices subject to high temperatures.

If the PFPE used as component (A) has a kinematic viscosity v40 of less than 800 $mm^2/s$ at 40° C., the base oil leaks from an end of the fixing film even though the operation of the heat fixing device is stopped, and the amount of base oil in the grease composition decreases significantly. A reduced amount of base oil degrades the sliding ability between the inner surface of the fixing film and the nip forming member, leading to damage to the fixing film or the heater functioning as the nip forming member. In contrast, if the kinematic viscosity v40 exceeds 2500 $mm^2/s$, the drive torque required to drive the heat fixing device cooled in a low-temperature environment increases excessively. In some embodiments, the kinematic viscosity v40 at 40° C. ranges from 900 $mm^2/s$ to 2000 $mm^2/s$, for example, 1000 $mm^2/s$ to 1500 $mm^2/s$.

Also, if the kinematic viscosity v200 at 200° C. of the PFPE is higher than 1/50 of the kinematic viscosity v40, the friction between the fixing film and the nip forming member in the heat fixing device increases and degrades the sliding ability. Accordingly, the fixing film and the nip forming member may be overloaded, and breakage may occur in continuous use. This is because the temperature of the fixing film and the heater or the like functioning as the nip forming member rises high while the heat fixing device is operating. Therefore, the kinematic viscosity at high temperatures is desirably low from the viewpoint of ensuring a sliding ability between the fixing film and the nip forming member during the operation of the heat fixing device. In some embodiments, in addition, the kinematic viscosity v200 of the PFPE is 1/75 or less of the kinematic viscosity v40.

The kinematic viscosity of the PFPE is the value measured by a method according to JIS K2283.

The PFPE is commercially available. For example, "FOMBLIN Y" (trade name, produced by Solvay S. A.) is a PFPE having the structure represented by formula (I). Examples of the PFPE having the structure represented by formula (II) include "FOMBLIN Y" (trade name, produced by Solvay S. A.) and "Krytox" (trade name, produced by The Chemours Company). Also, "FOMBLIN Y" (trade name, produced by Solvay S. A.) is a PFPE having both structures represented by formulas (I) and (II). The PFPE may be selected appropriately among those products satisfying the kinematic viscosity requirements.

As with the PFPE, polytetrafluoroethylene, used as component (B), is chemically inert and does not decompose easily at high temperatures. Polytetrafluoroethylene is, therefore, suitable as the thickener of the grease composition for heat fixing devices subject to high temperatures. Polytetrafluoroethylene may be selected appropriately from those used as the thickener in lubricants or the like. Commercially available polytetrafluoroethylene products that can be used include "POLYFLON PTFE L-5F" (trade name) produced by Daikin Industries, Ltd. and "L173JE" (trade name) produced by AGC Inc.

The proportion of component (B) may range from 10 to 100 parts by mass relative to 100 parts by mass of component (A), for example, 20 to 80 parts by mass.

When components (A) and (B) are in such a proportion, the grease composition can be kept in a semi-solid state and prevented effectively from leaking, dropping, or resulting in exhaustion.

The grease composition disclosed herein may be produced by various known processes. For example, the perfluoropolyether oil is distilled under reduced pressure and then mixed with polytetrafluoroethylene. In this process, some additives may be mixed as required. Other additives like stabilizers contained in commercial products may be added to the extent that they do not impair the effects of the present disclosure.

(2) Image Forming Apparatus

The structure of an image forming apparatus used in an embodiment of the present disclosure will now be described with reference to the schematic sectional view in FIG. 1. An image forming apparatus 1 is a laser printer that forms images on a recording medium P by an electrophotographic method.

The image forming apparatus 1 includes a process cartridge 10 configured to be removable from the apparatus proper. The process cartridge 10 includes a photosensitive drum 19 functioning as an image bearing member, a charging roller 16 functioning as a charging device, a developing roller 17 functioning as a developing device, and a cleaning blade 18 functioning as a cleaning device. The image forming apparatus 1 also includes a paper feed cassette 21, a pickup roller 22, a paper feed roller 23, a pair of resist rollers 24, a transfer roller 12 functioning as a transfer member, and a heat fixing device 13.

The image forming apparatus 1 further includes a pair of fixing ejection rollers 25, a pair of main unit ejection rollers 26, an operation control unit 40, a motor 20 functioning to drive the heat fixing device, and another motor 100 functioning to drive other members.

The photosensitive drum 19 is driven for clockwise rotation at a predetermined peripheral speed (process speed). The charging roller 16 uniformly charges the periphery of the photosensitive drum 19 to a predetermined polarity and potential. The charged photosensitive drum 19 is scanned by and exposed to laser light emitted to the charged surface from a laser scanner 11. The laser scanner 11, which functions as an image exposure device, emits laser light on/off-modulated according to the time-series electrical digital pixel signals corresponding to image information to be formed output from an external apparatus (not shown), such as an image scanner or a computer. This scanning exposure eliminates the charge from the exposed bright areas on the periphery of the photosensitive drum 19 and forms electrostatic latent images corresponding to the image information on the photosensitive drum 19.

The developing roller 17 carries a developer (toner) on the surface and supplies the toner onto the periphery of the photosensitive drum 19 to develop the electrostatic latent images on the periphery of the photosensitive drum 19 into toner images one after another. Laser printers generally use reversal development methods in which toner is attached to the exposed bright areas of electrostatic latent images for development.

The paper feed cassette 21 is removable from the image forming apparatus 1, and in which recording media P are stacked and accommodated. The recording media P in the paper feed cassette 21 are conveyed to the paper feed roller 23 by the pickup roller 22 according to a paper feed start signal, and the paper feed roller 23 conveys the media separately one by one to the image forming apparatus 1 proper. The recording medium P fed into the image forming apparatus with the paper feed roller 23 is conveyed to the pair of resist rollers 24 through a conveyance path 30. The recording medium P conveyed to the resist rollers 24 is conveyed to a conveyance path 31 by the resist rollers 24 and introduced to a transfer nip T defined by the photosensitive drum 19 and the transfer roller 12.

The recording medium P in the transfer nip T is pinched and conveyed through the transfer nip T. At the same time, the transfer roller 12 receives a transfer voltage controlled to a predetermined level from a transfer voltage applying power supply (not shown).

On applying the transfer voltage with an opposite polarity to the toner to the transfer roller 12, the toner image on the periphery of the photosensitive drum 19 is electrostatically transferred to the surface of the recording medium P. The recording medium P to which the toner image is transferred is conveyed from the transfer nip T through a conveyance path 32 and introduced into the heat fixing device 13.

The heat fixing device 13 includes a fixing film 14 and a pressure roller 15. The recording medium P in the heat fixing device 13 is pinched and conveyed through the fixing nip F defined by the fixing film 14 and the pressure roller 15. At the same time, the toner image on the recording medium P is heated by the fixing film 14 controlled to a predetermined temperature (fixing temperature), thereby fixed to the recording medium P.

The recording medium P to which the toner image is fixed in the heat fixing device 13 is ejected from the heat fixing device 13 by the fixing ejection rollers 25 configured to eject the recording medium P and conveyed through a conveyance path 33. Then, the pair of main unit ejection rollers 26 eject the recording medium to an ejection tray 27 from the image forming apparatus, thus completing an image formation.

In the photosensitive drum 19, after the transfer of the toner image to the recording medium P, its periphery is cleaned with the cleaning blade 18 to remove the remaining toner, paper dust, or the like and recharged for the next image formation.

By repeating the series of the above operations, images can be continuously formed. The image forming apparatus 1 used in the present embodiment can print monochrome images on 60 A4-size (210 mm×297 mm) paper sheets per minute at a process speed of 340 mm/s.

(3) Heat Fixing Device

Figure 2:
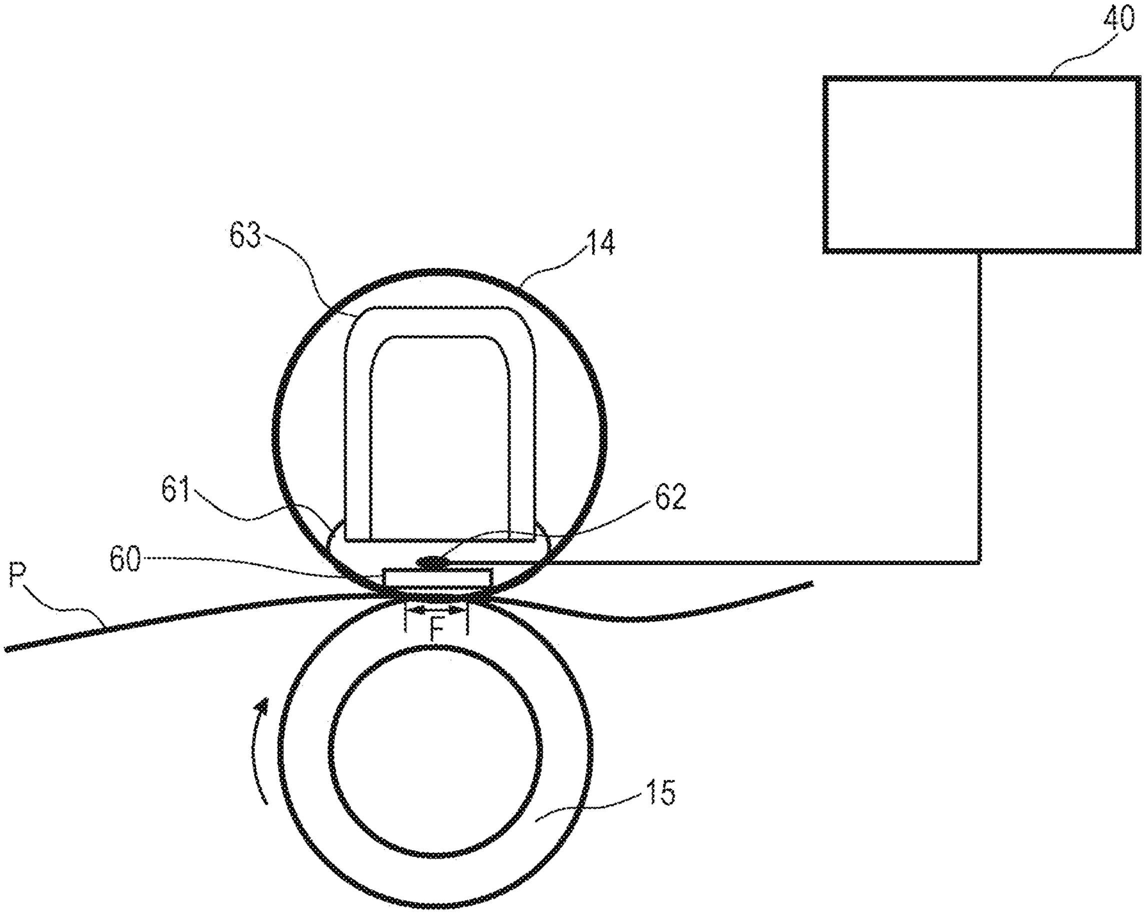
FIG. 2 is a schematic structural view of a heat fixing device according to an embodiment of the present disclosure.
Figure 3:
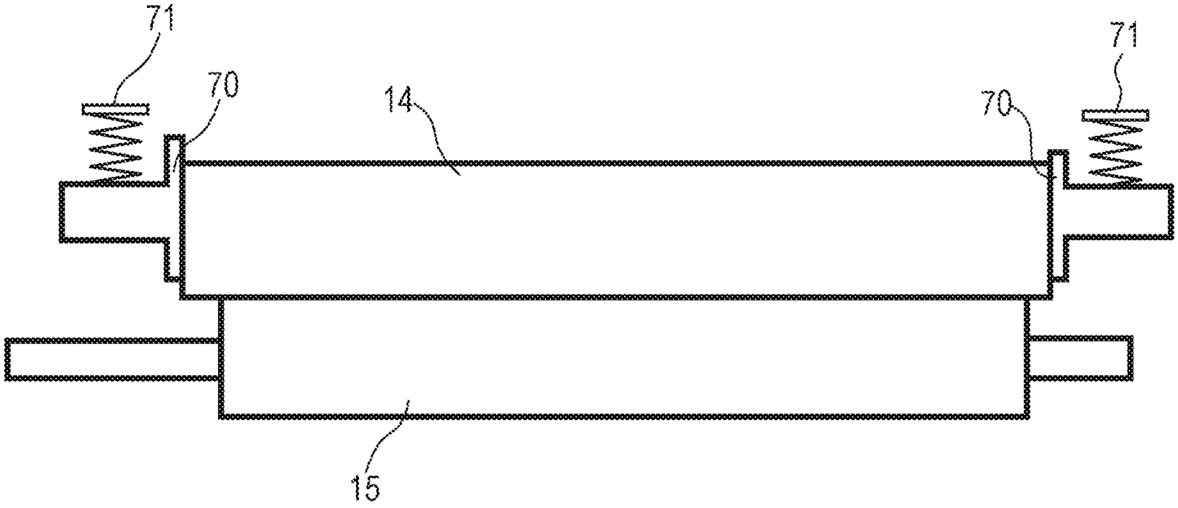
FIG. 3 is a schematic longitudinal structural view of a heat fixing device according to an embodiment of the present disclosure.

FIGS. 2 and 3 are schematic structural views of a heat fixing device 13 of an embodiment according to the present disclosure. The heat fixing device 13 includes a fixing film 14 functioning as a heating rotor, a pressure roller 15 opposite the fixing film 14, functioning as a pressure rotor, and a ceramic heater 60 functioning as a heating member.

The fixing film 14 is a highly heat-resistant hollow cylindrical multilayer member including a base layer made of a heat-resistant resin, such as polyimide, of 100 μm or less in thickness. The surface layer of the fixing film 14 is a releasing layer coated with a releasable fluororesin, such as perfluoroalkoxy alkane (PFA).

The pressure roller 15 includes a core metal made of iron, aluminum, or the like and an elastic layer made of highly heat-resistant rubber material, such as silicone rubber.

The ceramic heater 60 is a heating member disposed inside the fixing film 14 and heats the fixing nip F where the toner on the recording medium P is fused and fixed. The ceramic heater 60 includes a ceramic substrate that is a base member made of alumina or the like, and a heating member is screen-printed with silver paste or the like on the ceramic substrate and covered with a glass coating as an insulating protective layer. The fixing film 14 rotates with the ceramic heater 60 inside sliding against the inner periphery of the fixing film 14. The portion of the ceramic heater 60 that slides against and contacts the inner periphery is a slide portion (slide surface). The frictional resistance between the ceramic heater 60 and the fixing film 14 should be kept low at this slide portion. Accordingly, a lubricant is applied onto the glass coating of the ceramic heater 60 in advance so that the lubricant lies between the inner surface of the fixing film 14 and the glass coating of the ceramic heater 60 to reduce the frictional resistance, thus ensuring a sliding ability. The grease composition detailed above is used as the lubricant.

The ceramic heater 60 is held by a heater holding member 61, and the heater holding member 61 holding the ceramic heater 60 is held by a metal stay member 63.

The heater holding member 61 and the metal stay member 63 are provided with fixing flanges 70 at the ends in the longitudinal direction, as depicted in FIG. 3. The fixing flanges 70 are mounted on both longitudinal ends of the fixing film 14 to restrain the ends of the fixing film 14. Each fixing flange 70 is provided with a pressure spring 71 to apply pressure to the fixing flange 70. The pressure spring 71 presses the ceramic heater 60 against the pressure roller 15 with the fixing film 14 in between, thus defining the fixing nip F. The core metal of the pressure roller 15 is connected to a motor 20, depicted in FIG. 1, with a coupling gear or the like. As the motor 20 drives the pressure roller 15 to rotate, the fixing film 14 is driven to rotate by the rotation of the pressure roller 15. When the recording medium P is pinched and conveyed through the fixing nip F, undeveloped toner images on the recording medium P are fixed.

A thermistor 62 as a temperature detection element is in contact with the ceramic heater 60, and the control unit 40 controls the energization of the ceramic heater 60 according to the detection results of the temperature detection element so that the detected temperature of the thermistor 62 reaches the desired target temperature. The control unit 40 performs image forming and fixing operations at fixing temperature under image forming conditions according to the printing mode set by the user.

EXAMPLES

The grease composition disclosed herein will be further disclosed in detail with reference to the Example and Comparative Examples, but the implementation of the disclosure is not limited by the following Example.

Example

Preparation of Grease Composition of the Example

A perfluoropolyether oil having at least one of the structures represented by formulas (I) and (II) in the molecule was distilled under reduced pressure at temperatures of 230° C. to 240° C. and a pressure of 60 kPa for 30 hours. The perfluoropolyether oil used was Krytox GPL107 (trade name, produced by The Chemours Company), which has the structural unit represented by the following formula (III). Then, low-molecular-weight components were removed from the perfluoropolyether oil, and the viscosity was adjusted to yield a base oil. The base oil was mixed with a polytetrafluoroethylene (trade name: POLYFLON PTFE L-5F, produced by Daikin Industries, Ltd.) to prepare a grease composition. The base oil and the polytetrafluoroethylene were mixed in a mass ratio of 75:25.

(III)

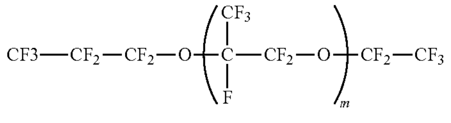

Comparative Example 1

A grease composition was prepared in the same manner as in the Example, except that the perfluoropolyether oil used in the Example was used as the base oil without distillation under reduced pressure.

Comparative Example 2

A grease composition was prepared in the same manner as in the Example, except that a perfluoropolyether oil (trade name: b1800, produced by BALBIS co., Ltd.), having the structural unit represented by formula (IV) in the molecule, was used as the base oil without distillation under reduced pressure.

(IV)

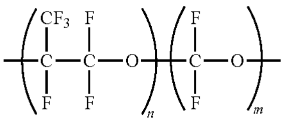

In formula (IV), n and m are each a positive number.

Table 1 presents the kinematic viscosities v40 at 40° C. and v200 at 200° of the base oils (perfluoropolyether oil) used in the Example and Comparative Examples 1 and 2 and their ratio v200/v40. When v200/v40 is 0.02 or less, it is 1/50 or less.

Kinematic viscosities are measured at the respective corresponding temperature according to JIS K2283.

TABLE 1

| | Example | Comparative Example 1 | Comparative Example 2 |
|---|---|---|---|
| Base oil kinematic viscosity v40 at 40° C. ($mm^2/s$) | 1107 | 450 | 494 |
| Base oil kinematic viscosity v200 at 200° C. ($mm^2/s$) | 13.5 | 12.4 | 35.8 |
| v200/v40 | 0.012 | 0.028 | 0.072 |

A heat fixing device was prepared as described below using a laser beam printer having the structure depicted in FIGS. 1 and 2.

In the heat fixing device, the pressure roller 15 included an iron core metal, an elastic layer of silicone rubber, and a PFA surface layer and had an outer diameter of 25 mm.

The fixing film 14 included a 70 μm-thick polyimide resin base layer coated with a 12 μm-thick fluororesin releasing layer.

The grease compositions of the Example and Comparative Examples 1 and 2, presented in Table 1, were each applied in 250 mg between the glass coating of the ceramic heater 60 and the inner surface of the fixing film 14.

Leakage Test of Grease Composition

Heat fixing devices with the same structure except for using any of the grease compositions of the Example and Comparative Examples 1 and 2 were each installed in an image forming apparatus and allowed to stand under the environment of 23° C. and 50% for 10 days (240 hours) without operation. Then, the heat fixing device was removed from the image forming apparatus and checked for the leakage of the grease composition.

Durability Test of Heat Fixing Device

Heat fixing devices with the same structure except for using any of the grease compositions of the Example and Comparative Examples 1 and 2 were each installed in an image forming apparatus and subjected to printing operation. The printing operation was continued until a failure occurred in the fixing film or the heater. In the printing operation, 5,000 sheets were continuously fed. After the completion of printing 5,000 sheets, the operation was suspended until the next day (with the heat fixing device also stopped). Then, another 5,000 sheets were fed the next day. Such operations were repeated. The paper sheets were A4-size paper "Red Label Presentation 80 g/mm$^2$" (manufactured by Canon Inc.)

For all of the heat fixing devices, the durability was evaluated by the number of sheets fed to the image forming apparatus by the time when the surface layer of the fixing film was first observed to be worn away, exposing the base layer and finally gone.

TABLE 2

| | Example | Comparative Example 1 | Comparative Example 2 |
|---|---|---|---|
| Leakage of grease composition | Slightly leaked | Leaked | Leaked |
| Number of sheets fed | 382000 | 333000 | 311000 |

When the grease compositions of Comparative Examples 1 and 2 were used, the base oil of the grease composition was observed to leak from the ends of the fixing film. More specifically, the base oil leaked from the ends of the fixing film and attached to the surfaces of the fixing flanges 70, depicted in FIG. 3, and the area around the longitudinal ends of the fixing film 14. In contrast, when the grease composition of the Example was used, only a small amount of the base oil was attached to the fixing flanges, and the leakage level of the base oil was slight. This is probably because the base oils of the grease compositions of Comparative Examples 1 and 2 had smaller kinematic viscosities at 40° C. than the base oil of the grease composition of the Example and tended to leak from the ends of the fixing film while the heat fixing device was stopped. In contrast, the base oil of the grease composition of the Example had a higher kinematic viscosity at 40° C. and probably tended not to leak.

For the durability of the heat fixing device, when the grease composition of the Example was used, the surface layer of the fixing film was worn away and exposed the base layer when 382,000 sheets were fed. When the grease compositions of Comparative Examples 1 and 2 were used, the base layer was exposed when 333,000 sheets and 311,000 sheets were fed, respectively.

Wear of the surface layer of the fixing film is more likely to progress as the sliding ability between the inner surface of the fixing film and the glass coating surface of the heater is poorer. This is because when the inner surface of the fixing film and the glass coating surface of the heater have poor sliding ability and large friction, the friction between the pressure roller and paper and the surface of the fixing film increases during the rotation of the fixing film. Thus, the wear of the surface layer of the fixing film correlates with the sliding ability between the inner surface of the fixing film and the glass coating of the heater. The sliding ability between the inner surface of the fixing film and the glass coating of the heater is ensured by maintaining an appropriate amount of base oil and an appropriate kinematic viscosity of the grease composition applied between them.

Compared to the Example, Comparative Examples 1 and 2 resulted in faster wear progression of the surface layer of the fixing film.

As presented in Table 1, the kinematic viscosity at 40° C. of the base oil of the grease compositions of Comparative Examples 1 and 2 is lower than that of the base oil of the grease composition of the Example. Accordingly, the base oils in Comparative Examples 1 and 2 are supposed to be more fluid than the base oil used in the Example and more likely to leak from the ends of the fixing film while the operation of the heat fixing device is stopped. This is consistent with the results of the leakages of the grease compositions presented in Table 2.

If the base oil leaks, the amount of the base oil between the inner surface of the fixing film and the glass coating of the heater decreases, degrading the sliding ability between the inner surface of the fixing film and the glass coating of the heater. Consequently, Comparative Examples 1 and 2 resulted in faster wear progression of the surface layer of the fixing film than the Example.

Furthermore, the reason for the faster wear progression in Comparative Example 2 than in Comparative Example 1 will be described below.

The kinematic viscosity at 200° C. of the base oil of the grease compositions of Comparative Example 2 is higher than that of the base oil of the grease composition of the Example and Comparative Example 1. Accordingly, in Comparative Example 2, the friction between the fixing film and the glass surface of the heater is larger than in the Example and Comparative Example 1 during the operation of the heat fixing device, increasing the friction between the surface of the pressure roller and the paper surface during the rotation of the fixing film. Thus, Comparative Example 2 resulted in faster wear progression of the surface layer of the fixing film.

Use of the grease composition as in the Example between the inner surface of the fixing film and the glass coating surface of the heater as the lubricant can ensure a sliding ability, ensuring a durability of the heat fixing device.

In the embodiments disclosed herein, implementation using a heat fixing device that heats a film using a ceramic heater has been described, but the heat fixing device is not limited to such a type.

Also, the base layer of the fixing film as the heating rotor is not limited to resin and may be made of metal. In a modification of the heat fixing device that heats a film using a ceramic heater, a metal plate may be disposed on a metal heater so that the metal plate and the fixing film slide against each other.

Also, the concept disclosed herein can be applied to heat fixing devices that heat a film using a known halogen heater by radiation or using induction heating. In any heat fixing device, the composition disclosed herein can be used as the grease composition applied to the slide portion, provided that the nip forming member and the inner surface of the fixing film slide against each other.

Also, although in the embodiment, the glass coating of the ceramic heater is provided in advance with a lubricant on the surface, the implementation of the disclosure is not limited to this. As long as a lubricant lies at the slide portion between the fixing film and the nip forming member, the lubricant may be applied in advance to the inner surface of the fixing film, for example.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-080059, filed May 15, 2023, which is hereby incorporated by reference herein in its entirety.

What is claimed is:

1. A grease composition comprising:

a base oil; and polytetrafluoroethylene, wherein the base oil contains a perfluoropolyether having at least one structure selected from the group consisting of a structure represented by formula (I) and a structure represented by formula (II) in a molecule, and wherein the base oil has a kinematic viscosity v40 of 800 $mm^2/s$ to 2500 $mm^2/s$ at 40° C., and whose kinematic viscosity v200 at 200° C. is 1/50 or less of the kinematic viscosity v40:

(I)

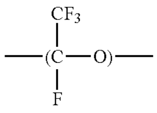

(II)

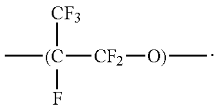

2. A heat fixing device comprising:

a heating rotor;

a slide portion on which the heating rotor slides during rotation;

a pressure rotor disposed opposite the heating rotor, and a grease composition between the slide portion and the heating rotor, the grease composition containing a base oil and polytetrafluoroethylene, wherein the base oil contains a perfluoropolyether having at least one structure selected from the group consisting of a structure represented by formula (I) and a structure represented by formula (II) in the molecule, and wherein the base oil has a kinematic viscosity v40 of 800 $mm^2/s$ to 2500 $mm^2/s$ at 40° C. and whose kinematic viscosity v200 at 200° C. is 1/50 or less of the kinematic viscosity v40:

(I)

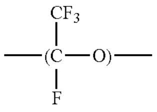

(II)

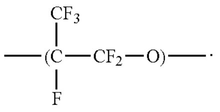

* * * * *